United States Patent [19]

Toyota et al.

[11] 4,061,217

[45] Dec. 6, 1977

[54] CLUTCH ACTUATING APPARATUS CONTROLLED BY ACCELERATOR

[75] Inventors: Hiroshi Toyota; Kenji Nagatome, both of Yokosuka; Tamio Kawamoto, Sagamihara, all of Japan

[73] Assignee: Nissan Motor Co., Ltd., Yokohama, Japan

[21] Appl. No.: 664,004

[22] Filed: Mar. 4, 1976

[51] Int. Cl.² .................... F16D 67/00; B60K 21/00
[52] U.S. Cl. .................... 192/.052; 192/.076; 192/91 R; 192/3.59
[58] Field of Search .................... 192/.052, .076

[56] References Cited

U.S. PATENT DOCUMENTS

| | | | |
|---|---|---|---|
| 2,391,192 | 12/1945 | Price | 192/.052 |
| 2,566,631 | 9/1951 | Price | 192/.076 |
| 2,605,872 | 8/1952 | Prather | 192/.052 |
| 3,273,679 | 9/1966 | Uher | 192/.076 |

*Primary Examiner*—Benjamin W. Wyche

[57] ABSTRACT

An apparatus for actuating an automatically operated clutch for use in the driveline of an automotive vehicle. Such apparatus being operative to drive the clutch to disengage when shift is being made in the transmission with the accelerator pedal kept depressed and also being operative, in response to vehicle speed, for enabling the clutch to be engaged at a moderate rate when the vehicle speed is higher than a predetermined level. The apparatus is responsive to movement of the accelerator pedal for enabling the clutch to be engaged at a rate varying with the depth to which the accelerator pedal is depressed, and also for enabling the clutch to be driven toward an engaged condition rapidly for a certain period of time slightly before the clutch is first brought into engagement.

5 Claims, 8 Drawing Figures

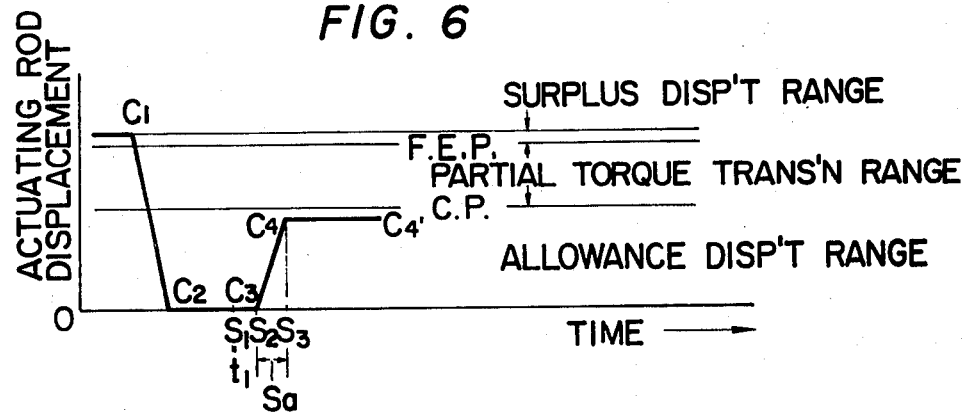
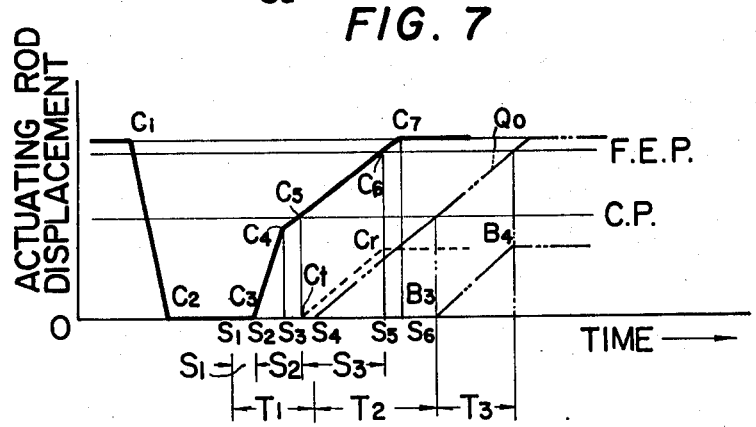
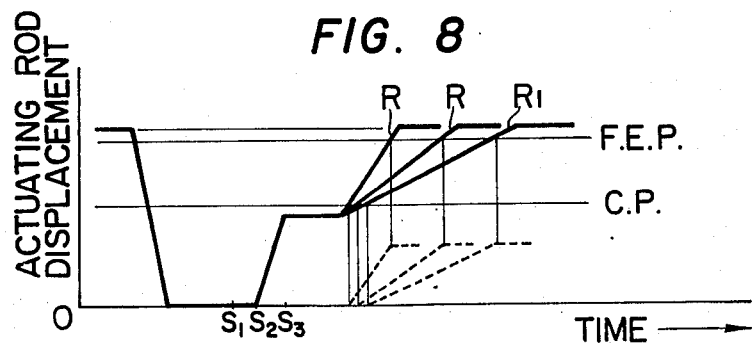

CLUTCH ACTUATING APPARATUS CONTROLLED BY ACCELERATOR

The present invention relates in general to clutches for use in the drivelines of automotive vehicles and, particularly, to a clutch of the type which is automatically operated in response to prescribed operational conditions of an automotive vehicle. More particularly, the present invention is concerned with an apparatus for automatically actuating such a clutch.

It is an object of the present invention to provide an automatic clutch actuating apparatus capable of engaging and disengaging an automatically operated clutch smoothly and at a reasonable rate responsive to prescribed operational conditions of the automotive vehicle.

It is another object of the present invention to provide an automatic clutch actuating apparatus adapted to prevent the clutch from being engaged during shifting of transmission gears with the accelerator pedal held released and to enable the clutch to engage rapidly upon completion of the gear shifting.

It is still another object of the present invention to provide an automatic clutch actuating apparatus responsive to vehicle speed for permitting the clutch to engage at a moderate rate when the vehicle is cruising at a speed higher than a predetermined level with the accelerator pedal kept released as when a braking action is to be imparted to the engine by the inertia of the vehicle running.

It is still another object of the present invention to provide an automatic clutch actuating apparatus responsive to vehicle speed lower than a predetermined level for preventing the clutch from being engaged if the accelerator pedal is kept depressed, enabling the vehicle to be brought to a halt with transmission gears held in mesh and to start from the halt smoothly and rapidly simply by depressing the accelerator pedal.

It is a further and another object of the present invention to provide an automatic clutch actuating apparatus which will enable the clutch to engage at a higher rate when the accelerator pedal is depressed deeper from the released position, irrespective of vehicle speed.

It is a further and another object of the present invention to provide an automatic clutch actuating apparatus capable of driving the clutch rapidly during a period of time immediately before the clutch is brought into engagement and driving the clutch toward the fully engaged condition thereof at a moderate rate after the clutch has once been engaged.

Yet, it is still another object of the invention to provide an automatic clutch actuating apparatus which is simple in construction, ready for installation in an automotive vehicle and economical to manufacture.

In accordance with the present invention, there is provided in an automotive vehicle including a vacuum source, a transmission gear shift lever and an accelerator pedal, an apparatus for actuating an automatically operated clutch forming part of the driveline of the vehicle and continuously operable between a disengaged condition and a fully engaged condition through a partial torque transmission range, comprising (a) a vacuum chamber in communication with a vacuum source such as the intake manifold of the engine, (b) an air chamber communicable with the open air through each of first and second restricted-flow air inlet ports, (c) a valve chamber alternately communicable with the vacuum chamber and the air chamber, (d) first valve meamns having a first position isolating the vacuum chamber from the valve chamber and establishing communication between the air chamber and the valve chamber and a second position blocking the communication between the air and valve chambers and establishing communication between the vacuum and valve chambers, (e) second valve means having a first position allowing the first air inlet port to open and a second position closing the first air inlet port, (f) third valve means continuously movable between a first position closing the second air inlet port and a second position allowing the second air inlet to fully open, (g) first valve actuating means for moving the first valve means in response to predetermined conditions of the transmission gear shift lever and the accelerator pedal, the first valve actuating means being operative to move the first valve means into the first position thereof in response to at least one of the condition in which the transmission gear shift lever is free from a manipulative effort and the condition in which the accelerator pedal is at least partially depressed from the released position and being operative to move the first valve the conditions in which the transmission gear shift lever is being manipulated and simultaneously the displacement of the accelerator pedal from the release position is smaller than a predetermined value kept, (h) second valve means responsive to vehicle speed for moving the second valve means into the first position thereof in reponse to a vehicle speed higher than a predetermined level and into the second position thereof in response to a vehicle speed lower than the above mentioned predetermined level, (i) third valve actuating means responsive to movement of the accelerator pedal for continuously moving the third valve means between the first and second positions thereof as the accelerator pedal is moved between the released position and the fully depressed position thereof so that the flow of air through the second air inlet port is varied substantially proportionate to the depth to which the accelerator pedal is depressed from the released position thereof, (j) a differential-pressure assembly including a variable-volume chamber which is defined in part by a flexible diaphragm which is at least partially movable between positions respectively providing minimum and maximum volume conditions of the variable-volume chamber, and biasing means for urging the diaphragm toward the position providing the maximum volume condition of the variable-volume chamber, the variable-volume chamber being in constant communication with the aforesaid valve chamber so that the diaphragm is moved toward the position providing the minimum volume condition of the variable-volume chamber in the presence of intake manifold vacuum in the valve chamber with the first valve means in the first position thereof and toward the position providing the maximum volume condition of the variable-volume chamber in the presence of atmospheric air in the valve chamber with the first valve means in the period position thereof, and (k) a mechanical linkage operatively interconnecting the diaphragm of the differential-pressure assembly and the aforesaid clutch for driving the clutch toward the disengaged position and fully engaged positions as the diaphragm is moved toward the positions providing the minimum and maximum volume conditions, respectively, of the variable-volume chamber.

The automatic clutch actuating apparatus thus constructed and arranged may further comprise a third air inlet port for providing substantially unrestricted communication between the air chamber and the open air independently of the above mentioned first and second air inlet ports, fourth valve means having a first position closing the third air inlet port and a second position establishing the communication between the air chamber and the open air through the third air inlet port, and fourth valve actuating means responsive to the movements of the diaphragm of the aforesaid differential-pressure assembly toward and away from the position providing the minimum volume condition of the variable-volume chamber, the fourth valve actuating means being operative to move the fourth valve means into the first position thereof in response to the movement of the diaphragm over more than a predetermined distance away from the position providing the minimum volume condition of the variable-volume chamber and into the second position thereof in response to the movement of the diaphragm over the above mentioned predetermined distance toward and into the position providing the minimum volume condition of the variable-volume chamber. In this instance, the fourth valve actuating means may comprise a solenoid operated valve actuating unit having first and second conditions holding the fourth valve means in the first and second positions, respectively, thereof, switch means electrically connected to the valve actuating unit, a switch actuating element projecting into the variable-volume chamber and engageable at one end with the diaphragm and at the other end with the switch means, the switch actuating element being movable back and forth over the above mentioned predetermined distance in a direction substantially identifal with the direction of movement of the diaphragm, the movement of the actuating element being between a first position disengaged from the switch means and a second position in actuating engagement with the switch means, the diaphragm being in engagement with the switch actuating element for holding the switch means actuated when the diaphragm is being moved over the predetermined distance toward and away from the position providing the minimum volume condition of the variable-volume chamber, the valve actuating unit being held in the second condition thereof when the switch means is kept actuated, and biasing means for urging the switch actuating means into the second position thereof. The above mentioned predetermined distance is such that will hold the diaphragm in a position operative to hold the clutch in a condition immediately prior to engagement in the previously mentioned partial torque transmission range when the diaphragm is moved away from the position providing the minimum voltage condition toward the position providing the maximum volume condition of the variable-volume chamber.

The features and advantages of an automatic clutch actuating apparatus according to the present invention will be understood more clearly from the following description taken in conjunction with the accompanying drawings, in which:

FIGS. 6 to 8 are diagrams illustrating examples of the performance characteristics of the clutch actuating apparatus shown in FIG. 5.

Figure 1:
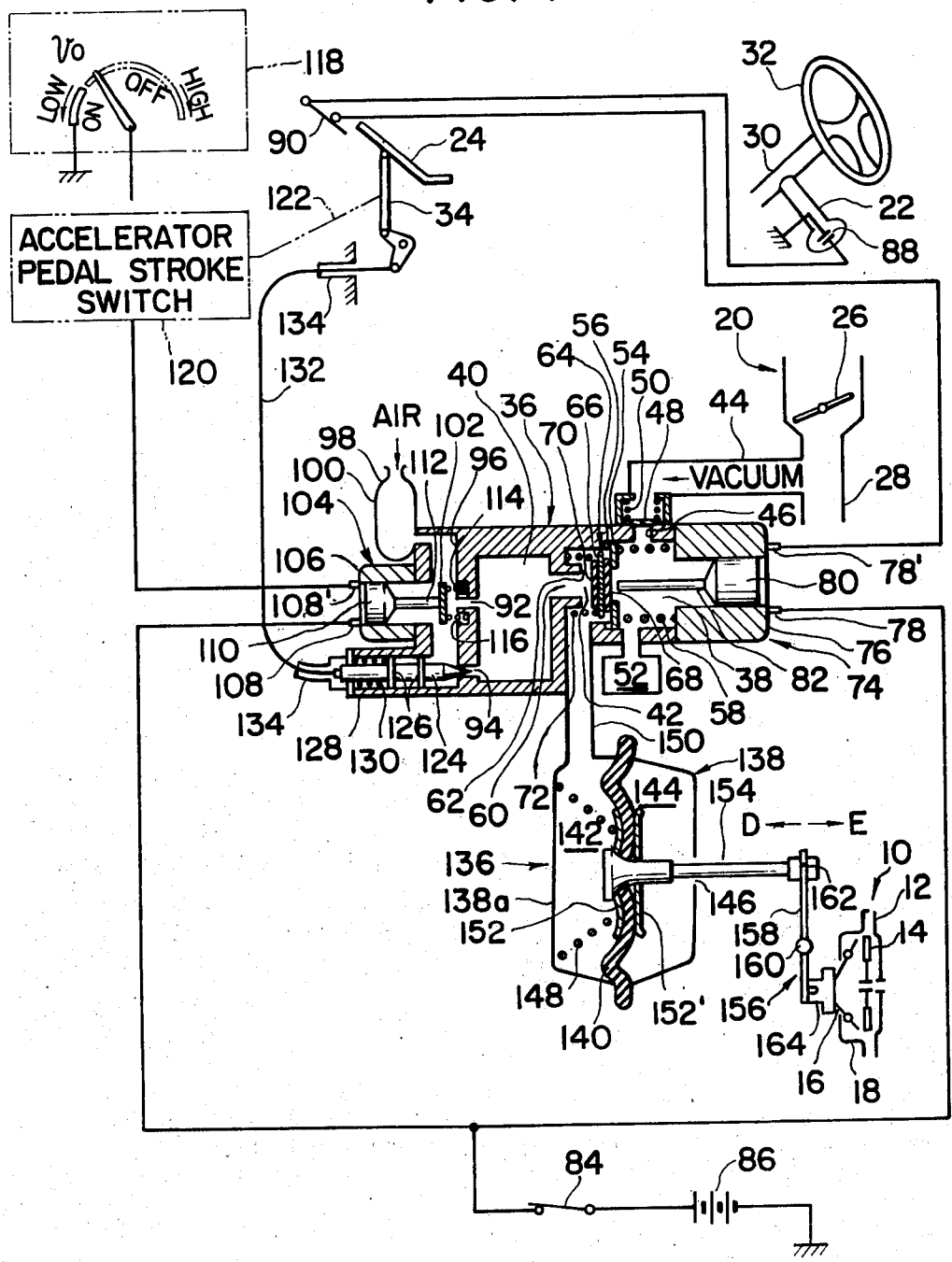
FIG. 1 is a schematic view, mostly in section, of a preferred embodiment of the automatic clutch actuating apparatus according to the present invention.

Reference will now be made to the drawings, first to FIG. 1 which illustrates an embodiment of the apparatus according to the present invention. The apparatus is intended to actuate a clutch 10 which is provided in the driveline of a vehicle and which is schematically shown, by way of example, to be a single-plate dry-disc friction clutch which largely comprises, as is customary, a flywheel 12, a friction disc 14, a release lever assembly 16 with a spring loaded pressure plate (not shown), and a clutch cover 18. Though not shown, the flywheel 12 and the friction disc 14 are connected to the engine crankshaft and the transmission drive shaft, respectively, and are biased to be in engagement with each other by the spring loaded pressure plate of the release lever assembly and thus couple the engine crankshaft and the transmission drive shaft together, as is well known in the art. When an external force is applied to the release lever assembly 16 in a predetermined direction which is assumed in FIG. 1 to be rightward of the drawing, then the pressure plate releases the friction disc 14 from the flywheel 12 so that the engine crankshaft and the transmission drive shaft are uncoupled. The shown construction of the clutch 10 is merely for the purpose of illustration of a clutch for automotive use and the apparatus embodying the present invention is applicable to any type of mechanically operated clutch for use in the driveline of an automotive vehicle. The details of the constructions and operation of automotive clutches in general are well known in the art and are rather immaterial for the understanding of the present invention, no further description thereof will be herein required.

In FIG. 1, furthermore, the vehicle is shown to include, as is customary in the art, an air-fuel mixture supply system 20 for the engine (not shown), a transmission gear shift lever 22, and an accelerator pedal 24. The mixture supply system 20, which may be a carburetor or of the electronically controlled fuel injection type, is shown to include a throttle valve 26 located upstream of an intake manifold 28 of the engine. A partial vacuum is developed in the intake manifold 28 when the engine is in operation, as is well known in the art. The transmission gear shift lever 22 is shown, by way of example, to be of the type mounted on a steering column 30 carrying a steering wheel 32 at its top but, if desired, the shift lever 22 may be of the floor-board mounted type. The accelerator pedal 24 is connected by a mechanical linkage, part of which is shown at 34, to the shaft of the throttle valve 26 in the mixture supply system 20 for controlling the flow of air-fuel mixture (in a carburetor type engine) or the flow of air to be delivered into the intake manifold 28.

Now, the embodiment of the present invention as shown in FIG. 1 comprises a generally cylindrical casing 36 which is formed with a vacuum chamber 38, an air chamber 30 and a valve chamber 42. The vacuum, air and valve chambers 38, 40 and 42 are arranged in series with each other with the valve chamber 42 located intermediate between the vacuum and air chambers 38 and 40. The vacuum chamber 38 is in communication with the intake manifold 28 of the engine through a vacuum passageway 44 and a vacuum inlet port 46 formed in the casing 36. The vacuum passageway 44 has provided at its terminal end next to the vacuum inlet port 46 a one-way check valve 48 which is biased to close the vacuum inlet port 46 by means of a preload spring 50. The one-way check valve 48 is adapted to prevent leakage of vacuum from the vacuum chamber 38 backwardly into the vacuum passageway 44 when the vacuum in the intake manifold 28 transiently becomes lower in absolute valve than the vacuum which has been developed in the vacuum chamber 38. The vacuum chamber 38 is provided and in constant communication with a vacuum reservoir 52 having a predetermined internal capacity.

The casing 36 is formed between the vacuum and valve chamber 38 and 42 a stepped internal wall portion forming an annular face at the end of the vacuum chamber 38 adjacent to the valve chamber 42. An annular valve seat member 54 is seated on this annular face through a resilient seal-off element 54 and is elastically held against the seal-off element 56 which is accordingly forced against the above mentioned annular face of the casing 36 by means of a preload spring 58. The annular valve seat member 54 has a circular opening through which communication is provided between the vacuum and valve chambers 38 and 42.

The casing 36 has further formed therein an air passageway 60 for providing communication between the air chamber 40 and the valve chamber 42. The end of the air passageway 60 in the valve chamber 42 is defined by a valve seat wall portion 62 which is spaced apart from the above mentioned valve seat member 54 between the vacuum and valve chambers 38 and 42. A two-position valve 64 consists of a rigid valve disc 66 and resilient seal-off layers 68 and 70 fixedly attached to the opposite end faces of the valve disc 66. The two-position valve 64 is positioned within the valve chamber 42 and is movable between a first position having one seal-off layer 68 in contact with the valve seat member 54 between the vacuum and valve chambers 38 and 42 and a second position having the other seal-off layer 70 in contact with the valve seat wall portion 62 at the end of the passageway 60 between the air and valve chambers 40 and 42. When the valve 64 is in the first position thereof as illustrated in FIG. 1, the vacuum chamber 38 is isolated from the valve chamber 42 by the valve 64 closing the opening in the valve seat member 54 and communication is established between the air and valve chambers 40 and 42 through the air passageway 60 with the valve 64 spaced apart from the valve seat wall portion 62 at the end of the passageway 60. When, on the other hand, the valve 64 is in the second position thereof, the communication between the air and valve seat chambers 40 and 42 is blocked by the valve 64 seated on the valve seat wall portion 62 and communication is established between the vacuum and valve chambers 38 and 42 with the valve 64 spaced apart from the valve seat member 54. The two-position valve 64 is biased into the above mentioned first position thereof by means of a preload spring 72 which is seated at one end on the outer circumferential portion of the valve disc 66 and an opposite annular wall portion of the casing 36 surrounding the air passageway 60.

The two-position valve 64 thus arranged is actuated into the second position thereof by a solenoid operated valve actuating unit 74 which is located adjacent the end of the vacuum chamber 38 opposite to the valve chamber 42. The valve actuating unit 74 comprises a solenoid coil 76 with input and output terminal leads 78 and 78' and a solenoid core 80 concentrically surrounded by the solenoid coil 76 and axially movable toward and away from the vacuum chamber 38 when the solenoid coil 76 is energized and deenergized, respectively. The solenoid core 80 is fixedly connected to or integral with a plunger 82 axially projecting into the vacuum chamber 38 toward the valve chamber 42 through the circular opening in the valve seat member 54 between the vacuum and valve chambers 38 and 42. When the solenoid coil 76 is energized and accordingly the solenoid core 80 is axially moved toward the vacuum chamber 38, the plunger 82 is axially moved through the vacuum chamber 38 and the opening in the valve seat member 54 into pressing engagement with the seal-off layer 68 of the two-position valve 64, which is consequently forced to unseat from the valve seat member 54 and is brought into pressing contact through its seal-off layer 70 with the valve seat wall portion 62 at the end of the passageway 60 between the air and valve chambers 40 and 42 against the opposing force of the preload spring 72. When the solenoid coil 76 is de-energized and accordingly the solenoid core 80 is moved away from the vacuum chamber 38, the plunger 82 is axially moved back away from the valve chamber 42 and releases the two-position valve 64. As a consequence, the two-position valve 64 is moved from the second position thereof into the first position closing the opening in the valve seat member 54 by the biasing force of the preload spring 72. The previously mentioned preload spring 58 holding the valve seat member 54 into position between the vacuum and valve chambers 38 and 42 is shown seated at one end on the body of the solenoid coil 76 and at the other end on the annular valve seat member 54.

The input terminal lead 78 of the solenoid coil 76 is electrically connected across a switch 84 to the positive terminal of a d.c. power source 86, while the output terminal lead 78' of the coil 76 is electrically connected to ground across a series combination of switches 88 and 90 which are respectively responsive to the motions of the transmission gear shift lever 22 and the accelerator pedal 24. The gear shift lever responsive switch 88 is arranged to close when the transmission gear shift lever 22 is being manipulated for making gear shift in the transmission and to open when the shift lever 22 is released from the manipulative effort. On the other hand, the accelerator pedal responsive switch 90 is arranged to close when the accelerator pedal 24 is released and to open when the accelerator pedal 24 is depressed for acceleration of the vehicle. The switch 84 connected to the d.c. power source 86 is assumed to be the ignition switch.

The air chamber 40 has first and second restricted-flow air inlet ports 92 and 94 formed in a wall portion of the casing 36. The air inlet ports 92 and 94 are in communication with a common air inlet passageway 96 which is vented from the open air through an air filter unit 98 stuffed with a suitable filter medium 100. The air inlet passageway 96 has provided therein a two-position valve 102 which is arranged to close and open the first air inlet port 92 under the control of a solenoid-operated valve actuating unit 104. The valve actuating unit 104 is composed of a solenoid coil 106 with input and output terminal leads 108 and 108' and a solenoid core 110 concentrically surrounded by the solenoid coil 106 and axially movable toward and away from the above mentioned first air inlet port 92 when the solenoid coil 106 is energized and de-energized, respectively. The solenoid core 110 is fixedly connected to or integral with a plunger 112 axially projecting toward the air inlet port 92. The two-position valve 102 is located between the plunger 112 and the outer end of the first air inlet port 92 and is elastically held in pressing contact with the leading end of the plunger 112 by means of a preload spring 114 which is seated at one end on the valve 102 and received in part in an annular groove 116 formed in the wall portion of the casing 36 which surrounds the first air inlet port 92 as shown. When the solenoid coil 106 remains deenergized so that the solenoid core 110 and accordingly the plunger 112 are held in their respective axial positions remotest from the first air inlet port 92, the two-position valve 112 is spaced apart from the air inlet port 92 by the biasing force of the preload spring 114 and allows the first air inlet port 92 to open, thereby establishing communication between the air chamber 40 and the air inlet passageway 96 through the first air inlet port 92. Under these conditions, atmospheric air admitted into the air inlet passageway 96 by way of the air filter unit 98 is allowed into the air chamber 40 through the first air inlet port 92 at a rate dictated by the effective cross sectional area of the port 92. The first air inlet port 92 thus serves, in effect, as an orifice providing a predetermined limited flow of air therethrough. The flow of air allowed through the orifice, viz., the effective cross sectional area of the first air inlet port 92 is predetermined in such a manner that will provide desired torque transmission characteristics in the clutch 10, as will be described more clearly. When, now, the solenoid coil 106 of the valve actuating unit 104 is energized, the solenoid core 108 and accordingly the plunger 112 are axially moved toward the air inlet port 92 and causes the two-position valve 102 to close the air inlet port 92 against the opposing force of the preload spring 114, thereby shutting off the flow of air through the first air inlet port 92 into the air chamber 40. In the arrangement shown, the two-position valve 102 and the plunger 112 may be fixedly connected together or, as an alternative, may be formed as an integral member, if desired. In this instance, the preload spring 114 may be dispensed with.

The input terminal lead 108 of the solenoid coil 106 is connected across the previously mentioned switch 84 to the positive terminal of the d.c. power source 86 and the output terminal lead 108' of the coil 106 is connected to ground across a vehicle speed responsive switch 118 which is schematically illustrated on a top left corner part of FIG. 1. The vehicle speed responsive switch 118 is arranged to be open in response to a vehicle speed higher than a predetermined level $v_o$ and to close in response to a vehicle speed lower than the predetermined level $v_o$. When, thus, the vehicle is cruising at a speed higher than the level $v_o$, the solenoid coil 106 is kept de-energized and as a consequence the two-position valve 102 is held in a position allowing the first air inlet port 92 to open as shown so that atmospheric air is admitted into the air chamber 40 through the air inlet port 92. When, however, the vehicle speed is lower than the predetermined level $v_o$, the solenoid coil 106 is energized from the d.c. power source 86 and holds the two-position valve 102 in a position closing the first air inlet port 92 so that the flow of air through the first air inlet port 92 into the air chamber 40 is interrupted. If desired, the vehicle speed responsive switch 118 may be connected in series with an accelerator pedal stroke switch 120 which is responsive to the movement of the accelerator pedal 24 through a suitable mechanical linkage 122. The accelerator pedal stroke switch 120 is adapted to close when the depth of the accelerator pedal depression is smaller than a predetermined value and to open when the depth of the accelerator pedal depression exceeds such a value. The reason for which the switch 120 of this nature is provided will be explained later.

The flow of air through the second air inlet port 94 is controlled continuously between zero and a predetermined maximum value as the accelerator pedal is moved between the released position and the fully depressed position thereof. This is achieved by means of a needle valve 124 having a tapered end portion projecting into the second air inlet port 94 from the outer end of the port. The needle valve 124 has flanges 126 axially slidable in a bore formed in a valve guide portion 128 of the casing 36 and is biased by a preload spring 130 in a direction having its tapered end portion seated at the outer end of the air inlet port 94 and thus fully closing the port. The needle valve 124 is connected by a flexible line such as a cable 132 to the mechanical linkage 34 of the accelerator pedal 24. Designated by 134 is a conduit through which the cable 132 extends longitudinally. The needle valve 124 is, thus, biased by the preload spring 130 to fully close the second air inlet port 94 but is driven from the accelerator pedal 24 through the mechanical linkage 34 and the cable 132 to move away from the air inlet port 94 so that the flow of air through the second air inlet port 94 from the air inlet passageway 96 into the air chamber 40 is continuously increased as the accelerator pedal 24 is depressed deeper and as a consequence the needle valve 124 is moved remoter from the air inlet port 94.

The apparatus embodying the present invention further comprises a differential-pressure assembly 136 which is operative on the vacuum or atmospheric pressure developed in the valve chamber 42 above described. The differential-pressure assembly 136 comprises a hollow housing 138 internally divided by a flexible diagram 140 into a variable-volume chamber 142 and an atmospheric chamber 144 which is constantly open to the atmosphere through an opening 146 formed in the housing 138 as shown. The housing 138 has a wall portion 138a which is spaced apart from the diaphragm 140 across the variable-volume chamber 142. The diaphragm 140 is urged away from the inner face of the wall portion 138a of the housing 138 by means of a preload spring 148 which is seated between the wall portion 138a and the diaphragm 140, the variable-volume chamber 142 being thus biased to expand by the spring 148. The variable-volume chamber 142 is in constant communication with the valve chamber 42 in the previously described casing 36 through a passageway 150. When the valve chamber 42 is in communication with the vacuum chamber 38, vacuum is thus developed in the variable-volume chamber 142. The vacuum acts on the diaphragm 140 and causes the diaphragm 140 to move toward the inner face of the wall portion 138a of the housing 138 against the opposing force of the preload spring 148 until the diaphragm 140 reaches a position closest to the wall portion 138a of the housing 138 and thus providing a minimum volume condition of the variable-volume chamber 142. When, on the other hand, the valve chamber 42 is in communication with the air chamber 40 in the casing 36, an atmospheric pressure obtains in the variable-volume chamber 142 so that the diaphragm 140 is moved away from the wall portion 138a of the housing 138 by the force of the preload spring 148 until the diaphragm 140 reaches a position remotest from the wall portion 138a and providing a maximum volume condition of the variable-volume chamber 142 as shown.

The diaphragm 140 has its central portion securely interpoed between retainer discs 152 and 152' and fixedly connected to a clutch actuating rod 154 which extends substantially perpendicularly from the diaphragm 140 and projects out of the housing 138 through the opening 146 opposite to the wall portion 138a of the housing 138. A mechanical linkage 156 comprises a lever 158 rotatable about a shaft 160 as a fulcrum. The lever 158 is pivotally connected at one end to the clutch actuating rod 154 and at the other end to a pressing member 164 which is in engagement with the release lever assembly 16 of the automatically operated clutch 10. When the diaphragm 140 of the differential-pressure assembly 136 is moved toward the position providing the minimum volume condition in the variable-volume chamber 142 as previously described, the clutch actuating rod 154 is moved leftwardly of the drawing as indicated by an arrow D so that the lever 158 is rotated about the shaft 160 counter-clockwise of the drawing and causes the clutch 10 to disengage. When, conversely, the diaphragm 140 of the differential-pressure assembly 136 is moved toward the position providing the maximum volume condition in the variable-volume chamber 142, the clutch actuating rod 158 is moved rightwardly of the drawing as indicated by an arrow E so that the lever 158 is rotated about the shaft 160 clockwise of the drawing and causes the clutch 10 to engage. The clutch 10 is in this fashion driven to engage and disengage when the diaphragm 140 of the differential-pressure assembly 136 is moved between the positions providing the minimum and maximum volume conditions of the variable-volume chamber 142.

When, in operation, the transmission gear shift lever 22 is manipulated from one position into another to make a shift in the transmission, then the shift lever responsive switch 88 closes. If, in this instance, the accelerator pedal 24 is released, the accelerator pedal responsive switch 90 also closes and makes a closed circuit through the d.c. power source 86 and the solenoid coil 76 of the valve actuating unit 74 with the ignition switch 84 kept closed. The solenoid coil 76 is therefore energized from the power source 86 and causes the solenoid core 80 to axially move toward the vacuum chamber 38. The plunger 82 is moved through the vacuum chamber 38 into pressing engagement with the two-position valve 64 in the valve chamber 42. The two-position valve 64 is moved away from the vacuum chamber 38 against the opposing force of the preload spring 72 and unseated from the valve seat member 54 between the vacuum and valve chambers 38 and 42, providing communication between the vacuum and valve chambers 38 and 42 through the opening in the valve seat member 54. The two-position valve 64 is finally seated on the valve seat wall portion 62 at the end of the passageway 60 between the air and valve chambers 40 and 42 and hermetically isolates the valve chamber 42 from the air chamber 40. Under these conditions, the vacuum which has been developed in the vacuum chamber 38 and the vacuum reservoir 52 draws air from the variable-volume chamber 142 of the differential-pressure assembly 136 through the valve chamber 42 and the passageway 150 with the result that vacuum is developed in the variable-volume chamber 142. The vacuum acts on the diaphragm 140, which is consequently moved toward the wall portion 138a of the housing 138 against the opposing force of the preload spring 148. This causes the clutch 10 to be disengaged by the action of the mechanical linkage 156 interconnecting the clutch 10 and the disphragm 140 of the differential-pressure assembly 136. The vacuum communication thus provided between the vacuum chamber 38 and the variable-volume chamber 142 causes a drop in the vacuum level in the vacuum chamber 38 and the vacuum reservoir 52. When the vacuum level in the vacuum chamber 38 is thus reduced, however, the check valve 48 is forced to move away from the vacuum inlet port 46 by the intake manifold vacuum developed in the vacuum passageway 44 and open the vacuum inlet port 46 until the vacuum in the vacuum chamber 38 and the vacuum reservoir 52 restores the level of the vacuum in the intake manifold 28. The force of the preload spring 50 acting on the check valve 48 is so small as to be capable of only retaining the valve 48 within the valve chamber in which the valve 48 is movable.

When the shift in the transmission is complete and the gear shift lever 22 is released from the manipulative effort which has been applied thereto, then the shift lever responsive switch 88 becomes open and disconnects the solenoid coil 76 of the valve actuating unit 74 from the power source 86 even though the accelerator pedal switch 90 may be kept closed. The solenoid coil 76 is now de-energized and causes the solenoid core 80 to retract into the initial position thereof and accordingly the plunger 82 to move back away from the valve chamber 42. The two-position valve 64 is consequently unseated from the valve seat wall portion 62 and is forced to seat on the valve seat member 54 between the vacuum and valve chambers 38 and 42 by the force of the preload spring 72, thereby blocking the communication between the vacuum and valve chambers 38 and 42 and providing communication between the air and valve chambers 40 and 42 through the passageway 60, as shown. Atmospheric air is therefore admitted through the air chamber 40, valve chamber 42 and passageway 60 into the variable-volume chamber 142 of the differential-pressure assembly 136. The diaphragm 140 of the assembly 136 is now moved by the preload spring 148 away from the wall portion 138a of the housing 138 toward the position providing the maximum volume condition of the variable-volume chamber 142. This causes the clutch 10 to engage by the action of the mechanical linkage 156 driven by the actuating rod 154 connected to the diaphragm 140, as previously described.

When the diaphragm 140 of the differential-pressure assembly 136 is in the position providing the minimum volume condition of the variable-volume chamber 142, the clutch actuating rod 154 is held in an axial position holding the clutch 10 completely disengaged, viz., maintaining the driving and driven members (i.e. the flywheel 12 and friction disc 14, respectively) of the clutch 10 spaced apart a maximum distance from each other. As the diaphragm 140 is moved away from the particular position, the clutch actuating rod 154 is moved in the direction of arrow E and causes the driven member to move closer to the driving member. Because, however, of an allowance which is provided for the clutch 10 and the clutch actuating mechanism including the actuating rod 154 and the mechanical linkage 156 to bring the driven member into engagement with the driving member of the clutch 10, there is a certain amount of interval before engagement is produced in the clutch 10 after the diaphragm 140 has been initiated into motion to move away from the position providing the minimum volume condition of the variable-volume chamber 142. Such an interval is herein referred to as a clutch disengagement allowance displacement range or simply as an allowance displacement range of the clutch actuating rod 154. At the end of the allowance displacement range of the actuating rod 154, the driven member of the clutch is brought into contact with the driving member so that the clutch 10 is allowed to engage. The instant thus producing engagement of the clutch 10 is herein called a coupling point (CP) in the movement of the actuating rod 154. For some time after the actuting rod 154 has passed through the coupling point maintaining the clutch 10 engaged, the driving and driven members of the clutch 10 are allowed to slide on each other and are unable to transmit torque therebetween at a 100 percent efficiency even though the actuating rod 154 continues axial displacement in the direction of the arrow E. The range of displacement of the actuating rod 154 under such a condition is herein termed a partial torque transmission range. When the actuating rod 154 is being moved within this range, the torque transmitted to the driven member from the driving member increases progressively as the actuating rod 154 is moved in the direction of the arrow E by the movement of the diaphragm 140 toward the position providing the maximum volume condition of the variable-volume chamber 142 of the differential-pressure assembly. As the actuating rod 154 is further moved, the revolution of the driven member of the clutch 10 is completely matched to the revolution of the driving member at the end of the partial torque transmission range so that the clutch 10 is fully engaged and enabled to transmit torque therethrough at a 100 percent efficiency. The particular instant is herein termed a full engagement point (FEP) in the movement of the actuating rod 154. The movement of the actuating rod 154 may be terminated at this full engagement point but, for the reason that will be understood later, it is preferable to provide a small allowance for the actuating rod 154 to further move beyond the full engagement point. The distance of allowance thus provided is herein referred to as a surplus displacement range of the actuating rod 154. The actuating rod 154 ceases to move at the end of this surplus displacement range when the diaphragm 140 of the differential-pressure assembly 136 reaches the position providing the maximum volume condition of the variable-volume chamber 142. When the diaphragm 140 is moved away from the position providing the maximum volume condition in the variable-volume chamber 142 toward the position to provide the minimum volume condition of the chamber 142, the above described events occur in a reverse sequence so that the torque transmission efficiency through the clutch 10 starts to diminish when the actuating rod 154 is moved in the direction of the arrow D past the above mentioned full engagement point and the clutch 10 is disengaged when the actuating rod 154 is moved beyond the coupling point thereof. The movement of the actuating rod 154 thus causing the clutch 10 to disengage is indicated by section $A_1$–$A_2$ of the plot shown by full lines in FIG. 2. The rate of displacement of the actuating rod 154 from the point $A_1$ to the point $A_2$, viz., the grade of the section $A_1$–$A_2$ is dictated by the rate at which vacuum is established in the variable-volume chamber 142 of the differential-pressure assembly 136 after the two-position valve 164 is moved to provide the communication between the vacuum and valve chambers 38 and 42. The section $B_1$–$B_2$ of the plot shown by broken lines in FIG. 2 indicates the variation of the torque transmission efficiency as caused when the actuating rod 154 is moved from the point $A_1$ to the point $A_2$.

Figure 2:
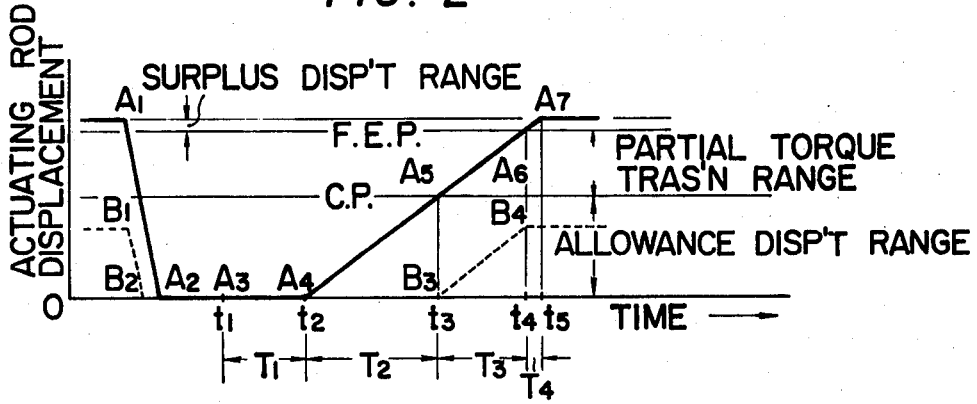
FIGS. 2 to 4 are diagrams which illustrate examples of the performance characteristics of the clutch actuating apparatus shown in FIG. 1.

The diaphragm 140 is held in the position providing the minimum volume condition in the variable-volume chamber 142 and, accordingly, the clutch actuating rod 154 is held in the axial position indicated by section $A_2$–$A_3$ in the plot of FIG. 2 when the solenoid coil 76 of the valve actuating unit 74 for the two-position valve 164 is kept energized. When, however, the transmission gear shift lever 22 is released and as a consequence the gear shift responsive switch 88 is closed upon completion of shifting in the transmission, the solenoid coil 76 of the valve actuating unit 74 is de-energized and allows the valve 164 to block the vacuum communication between the vacuum chamber 38 and the variable-volume chamber 142 in the differential-pressure assembly 136 through the valve chamber 42. Communication is now provided between the air chamber 40 and the valve chamber 40 in the casing 36 and through the valve chamber 42 and the passageway 150 between the air chamber 40 in the casing 36 and the variable-volume chamber 142 in the differential-pressure assembly 136. If, under these conditions, the vehicle is running at a speed lower than the previously mentioned predetermined level $v_0$ and if the accelerator pedal 24 is left released as when the engine is to be driven by the inertia of the vehicle, the solenoid coil 106 of the valve actuating unit 104 for the two-position valve 102 associated with the first air inlet port 92 is energized from the power source 86 and simultaneously the needle valve 124 connected to the accelerator pedal linkage 34 is held in a position fully closing the second air inlet port 94. The two-position valve 102 is therefore held in a position allowing the first air inlet port 92 to open so that atmospheric air is admitted through the first air inlet port 92 at a predetermined rate (which is represented by H) into the air chamber 40 and is passed through the air chamber 40, passageway 60, valve chamber 42 and passageway 150 into the variable-volume chamber 142 in the differential-pressure assembly 136. Atmospheric pressure is thus developed in the variable-volume chamber 142 so that the preload spring 148 in the chamber 142 attempts to move the diaphragm 140 away from the position providing the minimum volume condition in the variable-volume chamber 142. Because, however, of the friction in play between some movable parts of the clutch 10 and the associated mechanical linkage 156 and because of the delay involved before the pressure in the variable-volume chamber 142 reaches a level effective, in cooperation with the biasing force of the preload spring 148, to initiate the diaphragm 140 into motion after time $t_1$ at which the solenoid coil 106 is assumed to be energized, the diaphragm 140 and accordingly the clutch actuating rod 154 start to move at time $t_2$ upon lapse of a certain period of time $T_1$ after the time $t_1$. As the diaphragm 140 is thus moved away from the position providing the minimum volume condition of the variable-volume chamber 142 and accordingly the clutch actuating rod 154 is axially moved in the direction of the arrow E, the clutch 10 is engaged progressively as indicated by section $A_4$–$A_5$ of the plot shown in FIG. 2. The rate of increase of the displacement of the actuating rod 154 is dictated by the rate H at which atmospheric air is passed through the first air inlet port 92 into the air chamber 40 in the casing 36.

Under the condition in which the actuating rod 154 is thus freely travelling within the clutch engagement allowance displacement range $A_4$–$A_5$, the clutch 10 is kept disengaged so that there is no torque transmitted through the clutch 10. When the actuating rod 154 reaches the coupling point CP at time $t_3$ upon lapse of a certain period of time $T_2$ after time $t_2$, the clutch 10 is brought into engagement and commences to transmit torque therethrough. As the clutch actuating rod 154 is further moved in the direction of the arrow E beyond the coupling point CP as indicated by section $A_5$–$A_6$ of the plot shown in FIG. 2, the torque transmission efficiency of the clutch 10 is increased in direct proportion to the amount of displacement of the actuating rod 154 as indicated by section $B_3$–$B_4$ of the plot in broken lines and reaches the maximum level at time $t_4$ upon lapse of a certain period of time $T_3$ after the time $t_3$. Under the condition in which the actuating rod 154 is being moved in the partial torque transmission range $A_5$–$A_6$, torque is transmitted at a limited but increasing rate through the clutch 10 so that a limited braking force is applied to the vehicle by the inertia of the vehicle driving the engine through the transmission gears and the clutch 10. At time $t_4$ which is the end of the partial torque transmission range, the clutch actuating rod 154 reaches the previously mentioned full engagement point FEP thereof and brings the clutch 10 into a fully engaged condition capable of transmitting torque therethrough at a 100 percent efficiency. The actuating rod 154 is kept driven by the diapragm 140 of the differential-pressure assembly 136 and is moved for a certain period of time $T_4$ through the surplus displacement range beyond the full engagement point FEP until the rod 154 reaches the extreme position at time $t_5$, as indicated by section $A_6$–$A_7$ of the plot shown in FIG. 2. By reason of the allowance thus provided for the actuating rod 154 to move slightly beyond the full engagement point FEP, the clutch 10 is guaranteed to be brought into perfectly engaged, slip-free condition. The above mentioned extreme position of the actuating rod 154 providing such a condition of the clutch 10 is reached when the diaphragm 140 of the differential-pressure assembly 136 is moved into the position providing the maximum volume condition of the variable-volume chamber 142 of the assembly 136.

If the transmission gear shift lever 22 is released from a manipulative effort under a condition in which the vehicle speed is lower than the predetermined level $v_o$, the air chamber 40 in the casing 36 is isolated from the open air with the solenoid coil 106 of the valve actuator 104 kept de-energized and, as a consequence, the clutch 10 can not be engaged unless the accelerator pedal 24 is depressed to drive the needle valve 124 to open the second air inlet orifice. For this reason, the vehicle can be brought to a halt without shifting the transmission into the neutral condition or continuedly applying a manipulative force to the transmission gear shift lever 22 until the vehicle is to be started from a halt.

Figure 3:
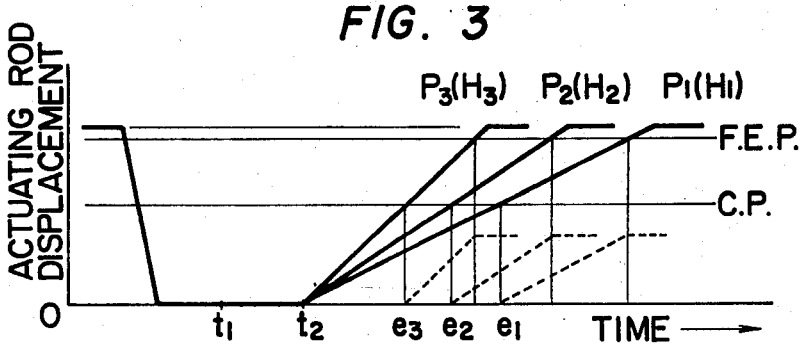

When the accelerator pedal 24 is depressed to start the vehicle from a halt, the needle valve 124 is driven through the cable 132 from the accelerator pedal and opens the second air inlet port 94. The needle valve 124 is arranged to vary the effective open area of the port 94 in direct proportion to the depth to which the accelerator pedal 24 is depressed from the released position. Atmospheric air is therefore introduced through the second air inlet port 94 into the air chamber 40 at a rate which increases as the accelerator pedal 24 is depressed deeper from the released position. Atmospheric air thus admitted into the air chamber 40 through the port 94 is directed through the passageway 60, valve chamber 42 and passageway 150 into the variable-volume chamber 142 of the differential-pressure assembly 136. The clutch 10 is therefore brought into engagement and driven toward the fully engaged condition progressively at a rate proportional to the rate of flow of air through the second air inlet port 94, viz., to the depth to which the accelerator pedal 24 is depressed from the released position. FIG. 3 illustrates examples of the movement of the clutch actuating rod 154 producing engagement in the clutch 10 which is actuated in the above described manner, wherein it is assumed that the vehicle is being driven at a speed lower than the predetermined level $v_0$ to maintain the vehicle speed responsive switch 118 open and accordingly the first air inlet port 92 is closed by the valve 102. When, thus, the second air inlet port 94 is opened at time $t_1$ with the accelerator pedal 24 depressed from the released position, atmospheric air is admitted into the variable-volume chamber 142 of the differential-pressure assembly 136 at a rate which is proportional to the amount of displacement of the accelerator pedal 24. For the reason previously explained, however, the diaphragm 140 of the assembly 136 and accordingly the clutch actuating rod 154 are held at rest for some time after the second air inlet port 94 is first opened. At a certain time interval after time $t_1$, the clutch actuating rod 154 is allowed to start to move at time $t_2$ at a rate proportional to the rate of flow of air through the second air inlet port 94. The rate of increase of the actuating rod displacement is thus augmented continuously as indicated by plots $P_1$, $P_2$ and $P_3$ as the flow rate of air through the port 94 is increased from $H_1$ to $H_2$ and from $H_2$ to $H_3$. The actuating rod 154 therefore reaches the coupling point of CP earlier times $e_1$, $e_2$ and $e_3$ as the accelerator pedal 24 is depressed to depths producing the air flow rates $H_1$, $H_2$ and $H_3$ through the second air inlet port 94.

Figure 4:
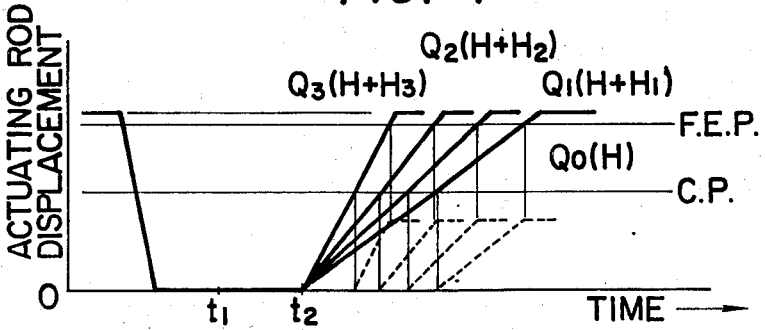

When the vehicle is cruising at a speed higher than the predetermined level $v_o$, the vehicle speed responsive switch 118 is closed to energize the solenoid coil 106 of the valve actuating unit 104 so that not only the second air inlet port 94 but the first air inlet port 92 is open. Under these conditions, the rate of increase of the displacement of the clutch actuating rod 154 is further augmented as indicated by plots $Q_1$, $Q_2$ and $Q_3$ in FIG. 4 in proportion to the total flow rate $H + H_1$, $H + H_2$ or $H + H_3$ of air through the first air inlet port 92 providing a fixed air flow rate $H$ and the second air inlet port 94 providing an air flow rate variable through $H_1$, $H_2$ and $H_3$. In FIG. 4, plot $Q_o$ indicates the displacement of the actuating rod 154 as caused by air passed through the first air inlet port 92 alone with the second air inlet port 94 closed. The plot $Q_o$ is thus identical with the plot shown in full lines in FIG. 2.

If the accelerator pedal 24 is depressed excessively when in starting the vehicle from a halt, there may be a risk that the engine operates at an excessively high speed because the clutch 10 can not be engaged at a proper timing by the flow of air through the second air inlet port 94 alone with the first air inlet port 92 kept closed until the vehicle speed reaches the predetermined level $v_o$. To prevent this from occurring, the accelerator pedal stroke switch 120 is connected in series with the vehicle speed responsive switch 118. The accelerator pedal stroke switch 120 is arranged to open in response to movement of the accelerator pedal 24 to a depth greater than a predetermined value from the released position and, thus, disconnects the solenoid coil 106 of the valve actuating unit 104 from the power source 84 when the accelerator pedal 24 is depressed to a depth greater than the predetermined valves. If the accelerator pedal 24 is depressed eccessively during starting of the vehicle from a halt, the two-position valve 102 is moved to open the first air inlet port 92 with the result that the clutch 10 can be engaged sufficiently fast by the flows of air through both of the first and second air inlet ports 92 and 94 even though the vehicle may be being moved at a low speed and accordingly the vehicle speed responsive switch 118 may be kept closed.

Figure 5:
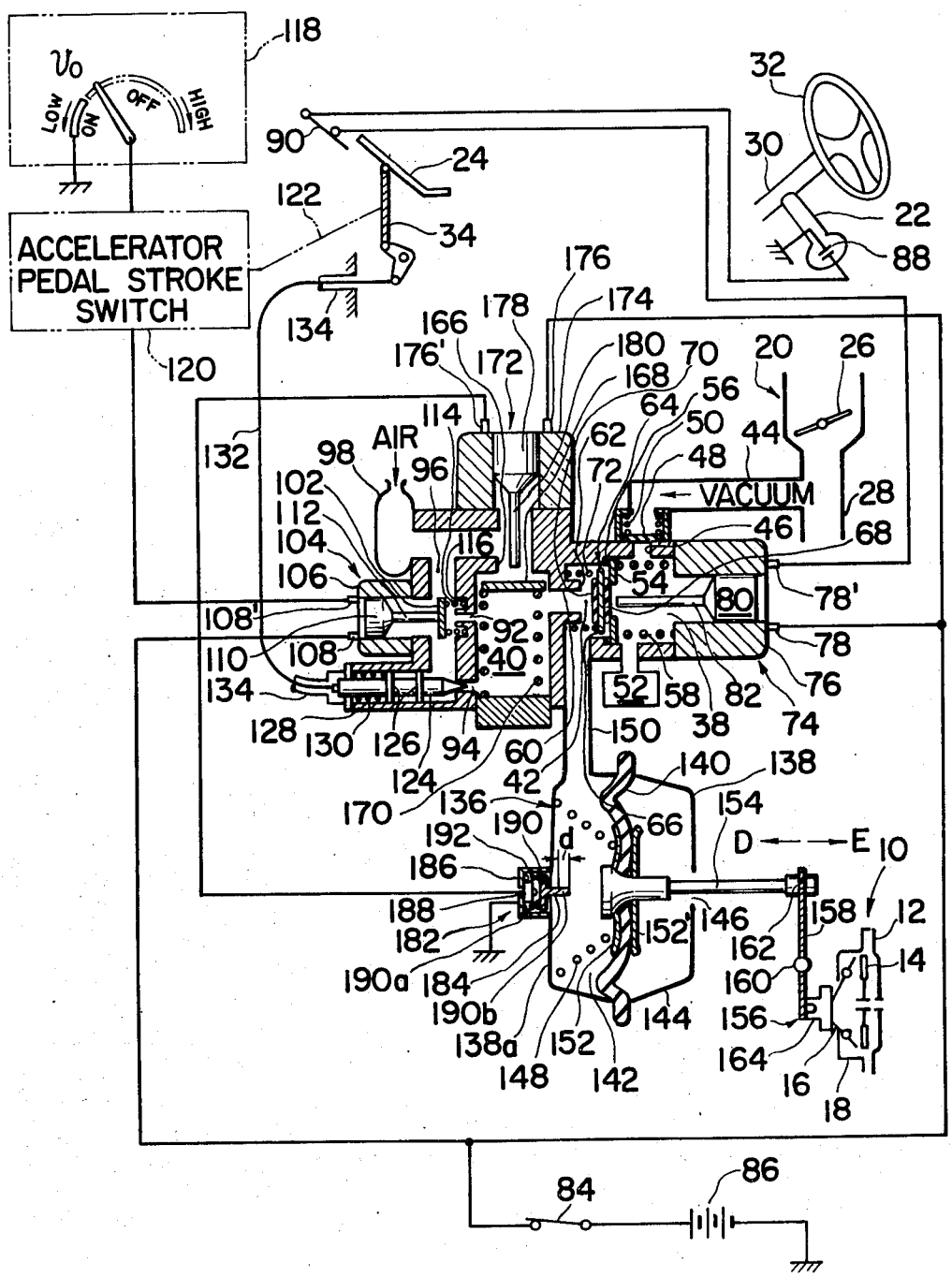
FIG. 5 is a view similar to FIG. 1 but shows another preferred embodiment of the automatic clutch actuating apparatus according to the present invention.

FIG. 5 illustrates a further improved version of the embodiment thus far described with reference to FIG. 1. In addition to the members and units of the embodiment of FIG. 1, the embodiment shown in FIG. 5 comprises valve means and valve actuating means adapted to further increase the rate at which the clutch 10 is permitted to fully engaged condition through the partial torque transmission range. For this purpose, the casing 36 is formed with a third air inlet port 166 for providing substantially unrestricted air communication between the air chamber 40 and the open air through the previously mentioned air inlet passageway 96 and the air filter 98. A two-position valve 168 is provided in the air chamber 40 and is movable between a first position to close the third air inlet port 166 as shown and a second position to allow the port 166 to open. The valve 168 is biased toward the first position thereof by means of a preload spring which is suitably disposed within the air chamber 40. To move the valve 166 into the second position thereof against the action of the preload spring 170, a solenoid operated valve actuating unit 172 is mounted on the casing 36 in association with the valve 168. The valve actuating unit 172 comprises a solenoid coil 174 with input and output terminal leads 176 and 176' and a solenoid core 178 which is concentrically surrounded by the solenoid coil 174 and which is axially movable toward and away from the above mentioned air inlet port 166 from the outside of the air chamber 40. The solenoid core 178 is fixedly connected to or integral with a plunger 180 projecting axially forward from the core 178 and thus axially movable with the core. The solenoid core 178 is held in an axial position remotest from the air inlet port 166 when the solenoid coil 174 remains de-energized and is moved into an axial position closest to the air inlet port 166 when the solenoid coil 174 is energized. When the solenoid core 178 is in the position remotest from the air inlet port 166 with the solenoid coil 174 kept denergized, the plunger 180 is positioned to have its leading end located slightly ahead of the valve 168 and, thus, allows the valve 168 to close the air inlet port 166 under the preesure of the preload spring 170 acting on the valve. When, however, the solenoid core 178 is moved into the position closest to the air inlet port 166, the plunger 180 is brought into pressing engagement at its leading end with the valve 168 and moves the valve 168 from the first position thereof toward the second position opening the air inlet port 166 against the opposing force of the preload spring 170, providing unrestricted communication between the air inlet passageway 96 and the air chamber 40 through the third air inlet port 166. The input terminal lead 176 of the solenoid coil 174 is connected across the previously mentioned switch 84 to the d.c. power source 86 and the output terminal lead 176' of the coil 174 is connected to ground across a diaphragm responsive switch unit 182 which is mounted on the housing 138 of the differential pressure assembly 136.

The housing 138 of the differential-pressure assembly 136 has formed in its wall portion 138a an aperture 184 which is located in alignment with the center axis of the clutch actuating rod 154 extending in a direction opposite to the aperture 184. The diaphragm responsive switch unit 182 comprises a switch casing 186 fixedly mounted on the outer face of the wall portion 138a of the housing 138 in such a manner as to contain therewithin the above mentioned aperture 184. The casing 186 has supported therewithin a set of normally-open contacts 188 located at a suitable spacing from the outer end of the aperture 184 in the wall portion 138a. The contacts 188 are electrically connected between ground and the output terminal lead 176' of the solenoid coil 174 and are adapted to close when depressed. A switch actuating element 190 has a presser portion 190a movable between the outer end of the aperture 184 and the set of contacts 188 and a plunger portion 190b projecting through the aperture 184 in the wall portion 138a of the housing 138 into the variable-volume chamber 142 of the differential-pressure assembly 136 in alignment with the center axis of the clutch actuating rod 154 connected to the diaphgram 140. The switch actuating element 190 is urged to be spaced apart from the set of contacts 188 and has its presser portion 190a forced against the outer face of the wall portion 138a of the housing 138 and its plunger portion 190b projecting deepest into the variable-volume chamber 142 by means of a preload spring 192 which is mounted within the switch casing 186, as shown. The switch actuating element 190 in its entirety is, thus, axially movable in a direction aligned with the direction of movement of the clutch actuating rod 154 between a first position having the presser portion 190a disengaged from the set of contacts 188 and the plunger position 190b projecting with a maximum length into the variable-volume chamber 142 through the aperture 184 and a second position having the presser portion 190a in pressing engagement with the set of contacts 188 and the plunger portion 190b projecting with a minimum length into the variable-volume chamber 142 through the aperture 184. The distance of stroke of the switch actuating element 190 thus moved between the first and second positions is represented by $d$ in FIG. 5. The preload spring 192 biases the switch actuating element 190 toward the above described second position thereof.

When, now, the transmission gear shift lever 22 is being manipulated to make a shift in the transmission and at the same time the accelerator pedal 24 is kept released, both the gear shift lever responsive switch 88 and the accelerator pedal responsive switch 90 are closed and energize the solenoid coil 76 of the valve actuating unit 74 for the two-position valve 64 in the casing 36. The solenoid core 80 and accordingly the plunger 82 of the valve actuating unit 74 are therefore moved forward and move the two-position valve 64 into the position providing communication between the vacuum chamber 38 and the valve chamber 42 through the opening in the valve seat member 54 between the vacuum and valve chambers 38 and 42, as previously described. Vacuum is thus developed in the variable-volume chamber 142 of the differential-pressure assembly 136 through the valve chamber 42 and the passageway 150 and acts on the diaphragm 140 in the assembly 136. The diaphragm 140 is consequently moved toward the wall portion 138a of the housing 138 against the opposing force of the preload spring 148 and causes the clutch 10 to progressively disengaged through the clutch actuating rod 154 and the mechanical linkage 156. Under these conditions, communication between the air chamber 40 and the valve chamber 42 is blocked by the two-position valve 64 seated on the valve seat wall portion 62 of the casing 36 and, simultaneously, the third air inlet port 166 is closed by the two-position valve 168 by the action of the preload spring 170 and with the solenoid operated valve actuating unit 172 held inoperative. As the diaphragm 140 is moved closer to the inner face of the wall portion 138a of the housing 138, the diaphragm 140 or, more exactly, the inner end of the clutch actuating rod 154 as shown is brought into pressing contact with the leading end of the plunger portion 190a of the switch actuating element 190 held by the preload spring 192 in the first position thereof having the plunger portion 190b projecting with the maximum length into the variable-volume chamber 142. As the diaphragm 140 is further moved toward the inner face of the wall portion 138, the switch actuating element 190 which is thus moved in its entirety toward the set of contacts 188 is brought into actuating engagement with the contact set 188. The contact set 188 is now closed and energizes the solenoid coil 174 of the valve actuating unit 172. This causes the solenoid core 178 of the valve actuating unit 172 to axially move toward the third air inlet port 166 of the air chamber 40 and brings the plunger 180 into pressing engagement with the two-position valve 168. The two-position valve 168 is moved by the plunger 180 away from the third air inlet port 166 and thus allows the port 166 to open, thereby providing unrestricted air communication between the air chamer 40 and the air inlet passageway 96 through he air inlet port 166. Atmospheric air is therefore admitted into the air chamber 40 through the third air inlet port 166 but is not passed into the variable-volume chamber 142 of the differential-pressure assembly 136 because the passageway 60 between the air and valve chambers 40 and 42 is closed by the two-position valve 64 with the solenoid operated valve actuating unit 74 kept operative. When the diaphragm 140 reaches the position providing the minimum volume condtion of the variable-volume chamber 142, the switch actuating element 190 which has been moved the distance $d$ from the initial position reaches the second position having the plunger portion 190b projecting with the minimum length into the variable-volume chamber 142 through the aperture 184. The axial displacement of the clutch actuating rod 154 following the movement of the diaphragm 140 as above described is indicated by section $C_1$–$C_2$ of the plot shown in FIG. 6.

When the shift is complete in the transmission and the transmission gear shift lever 22 is released from the manipulative effort which has been applied thereto, the gear shift responsive switch 88 becomes open as at time $s_1$ and causes the solenoid coil 76 of the valve actuating unit 74 to be de-energized. The two-position valve 64 in the valve chamber 42 is therefore moved back by the preload spring 62 into the position blocking the vacuum communication between the vacuum and valve chambers 38 and 42 and providing air communication between the air and valve chambers 40 and 42 through the passageway 60 therebetween. Atmospheric air which has been directed into the air chamber 40 is now directed into the variable-volume chamber 142 of the differential-pressure assembly through the passageway 60, valve chamber 42 and passageway 150. Because, however, of the frictional forces in play in the clutch 10 and the mechanical linkage 156 and because the delay in the development of an atmospheric pressure in the variable-volume chamber 142, the diaphragm 140 is initiated into motion to move away from the position providing the minimum volume condition of the chamber at time $s_2$ which is later a certain period of time $S_1$ than the time $s_1$ at which the valve 168 is initially moved to open the air inlet port 166. If, in this instance, the vehicle is crusing at a speed lower than the predetermined level $v_o$ set for the vehicle speed responsive switch 118 and if the accelerator pedal 24 is kept released, atmospheric air is admitted into the air chamber 40 through the third air inlet port 166 alone. The diaphragm 140 and accordingly the clutch actuating rod 154 are moved after times $s_2$ at a rate dictated by the rate of flow of air through the air inlet port 166 into the air chamber 40 as indicated by section $C_3$–$C_4$ of the plot shown in FIG. 6. When the diaphragm 140 is moved a distance $d$ from the position providing the minimum volume condition of the variable-volume chamber 142, the switch actuating element 190 is released from the pressing force of the diaphragm 140 and is forced to disengage from the contact set 188, which is consequently allowed to open. The solenoid coil 174 of the valve actuating unit 172 is now de-energized and allows the two-position valve 168 to close the third air inlet port 166 at time $s_3$ upon lapse of a certain period of time $S_d$ after the time $s_2$. The time period $S_d$ is determined by the distance of stroke $d$ of the switch actuating element 190. The switch unit 182 is preferably arranged so that the distance of stroke $d$ is such that will enable the clutch actuating rod 154 to assume a position immediately prior to the coupling point CP thereof, as will be seen from FIG. 6.

When the third air inlet port 166 is closed, there is no supply of air into the air chamber with the first and second air inlet ports 92 and 94 kept closed. The clutch actuating rod 154 is therefore "locked" in the position immediately prior to the coupling point CP thereof as indicated by line $C_4$–$C_4$, in FIG. 6 so that the clutch 10 can not be brought into engagement unless the accelerator pedal 24 is depressed to open the second air inlet port 94. The vehicle can be held at a halt with the transmission maintained in meshed condition. Because, furthermore, the clutch 10 is locked in a condition about to engage, the clutch 10 can be engaged almost instantaneously when the acclerator pedal 24 is depressed to start the vehicle from a halt.

If the vehicle is cruising at a speed higher than the predetermined level $v_o$ when the third air inlet port 166 is closed at time $s_3$, atmospheric air is admitted into the air chamber 40 only through the first air inlet port 92 at a fixed rate H so that the clutch actuating rod 154 is driven to move at a reduced rate dictated by the particular air flow rate H after time $s_3$, as indicated by section $C_4$–$C_5$ of the plot shown in FIG. 7. Upon lapse of a certain period of time after time $s_3$, viz., period of time $S_2$ after the time $s_2$ at which the actuating rod 154 was allowed to start, the actuating rod 154 reaches the coupling point CP at time $s_4$ and brings the clutch 10 into engagement, enabling the clutch to transmit torque at a limited rate. The torque thus transmitted through the clutch 10 with the actuating rod 154 being moved within the partial torque transmission range increases at a fixed rate which is dictated by the air flow rate H through the first air inlet port 92 as will be seen from section $C_f$–$C_r$ of the plot shown by broken lines in FIG.

7. In a period of time $S_3$ after the time $s_4$ at which the actuating rod 154 reached the coupling point CP, the actuating rod 154 reaches a full engagement position FEP at time $s_5$ and enables the clutch 10 to transmit torque at a 100 percent efficiency. Because of the allowance provided for the actuating rod 154 to slightly move beyond the full engagement position FEP, the actuating rod 154 continues to move through a surplus displacement range $C_6$–$C_7$ and ceases to move at time $s_6$, assuring the clutch 10 to be engaged in a completely slip-free condition. The rate of displacement of the actuating rod 154 through the partial torque transmission range can be adjusted by varying the rate of flow H of air through the first air inlet port 92.

When the acclerator pedal 24 is depressed from the released position to start the vehicle from a halt with the clutch 10 held in a condition bout to engage, the second air inlet port 94 becomes open and allows air to enter the air chamber 40 at a rate which increases as the accelerator pedal 24 is depressed deeper. The clutch actuating rod 154 is therefore moved and consequently the clutch 10 is brought into engagement and driven toward the fully engaged condition at higher rates as the accelerator pedal 24 is depressed deeper from the released position, as will be understood from plots $R_1$, $R_2$ and $R_3$. If, in this instance, the vehicle speed is higher than the predetermined level $v_0$ so that not only the second air inlet port 94 but the first air inlet port 92 is open, the clutch 10 will be driven toward the fully engaged condition at a further increased rate.

In each of the embodiments hereinbefore described with reference to FIGS. 1 and 5, the transmission gear shift lever and accelerator pedal responsive switches 88 and 90 are connected in series with the solenoid coil 76 of the valve actuating unit 74. Thus, even when the switch 88 is closed with the transmission gear shift lever 22 released from a manipulative effort, the clutch 10 can not be driven to disengage unless the accelerator pedal 24 is released to make the switch 90 closed. When, therefore, the accelerator pedal 24 is depressed with the shift lever responsive switch 88 kept closed, the clutch 10 is engaged automatically so that the engine can be prevented from operating at an excessively high speed. If, however, the solenoid coil 76 is connected to the power source 88 only through the gear shift responsive switch 88, there will be a risk that the engine operates at an excessively high speed if the accelerator pedal 24 is depressed from the released position with the gear shift lever switch is closed and accordingly the clutch is held disengaged.

The predetermined level $v_0$ of vehicle speed as set for the vehicle speed responsive switch 118 should be of a value within a relatively low range for the purpose of providing a relatively wide range enabling the engine to be braked upon by the inertia of the vehicle. For this reason, the switch 118 may be arranged to close in response to a vehicle speed lower than about 10 miles per hour, for example.

What is claimed is:

1. In an automotive vehicle including a vacuum source, a transmission gear shift lever and an accelerator pedal, an apparatus for actuating an automatically operated clutch forming part of the driveline of the vehicle and continuously operable between a disengaged condition and a fully engaged condition through a partial torque transmission range, comprising (a) a vacuum chamber in communication with said vacuum source, (b) an air chamber communicable with the open air through each of first and second restricted-flow air inlet ports, (c) a valve chamber alternately communicable with said vacuum chamber and said air chamber, (d) first valve means having a first position isolating said vacuum chamber from said valve chamber and establishing communication between said air chamber and said valve chamber and a second position blocking the communication between the air and valve chambers and establishing communication between the vacuum and valve chambers, (e) second valve means having a first position allowing said first air inlet port to open and a second position closing the first air inlet port, (f) third valve means continuously movable between a first position closing said second air inlet port and a second position allowing the second air inlet port to fully open, (g) first valve actuating means for moving said first valve means in response to predetermined conditions of the transmission gear shift lever and the accelerator pedal, said first valve actuating means being operative to move said first valve means into said first position thereof in response to at least one of the condition in which the transmission gear shift lever is free from a manipulative effort and the condition in which the accelerator pedal is at least partially depressed from the released position and being operative to move said first valve means into said second position thereof in response to the conditions in which the transmission gear shift lever is being manipulated and simultaneously the displacement of the accelerator pedal from the realeased position is smaller than a predetermined value, (h) second valve actuating means responsive to vehicle speed for moving said second valve means into said first position thereof in response to a vehicle speed higher than a predetermined level and into said second position thereof in response to a vehicle speed lower than said predetermined level, (i) third valve actuating means responsive to movement of the accelerator pedal for continuously moving said third valve means between said first and second positions thereof as the accelerator pedal is moved between the released position and the fully depressed position so that the flow of air through said second air inlet port is varied substantially proportionate to the depth to which the accelerator pedal is depressed from the released position thereof, (j) a differential-pressure assembly including a variable-volume chamber defined in part by a flexible diaphragm which is at least partially movable between positions respectively providing minimum and maximum volume conditions of said variable-volume chamber, and biasing means for urging said diaphragm toward the position providing the maximum volume condition in said variable-volume chamber, said variable-volume chamber being in constant communication with said valve chamber so that said diaphragm is moved toward the position providing the minimum volume condition of the variable-volume chamber in the presence of intake manifold vacuum in said valve chamber and toward the position providing the maximum volume condition of the presence of atmospheric air in the valve chamber, and (k) a mechanical linkage operatively interconnecting said diaphragm and said clutch for driving the clutch toward the disengaged and fully engaged conditions thereof as the diaghragm is moved toward the positions providing the minimum and maximum conditions, respectively, of said variable-volume chamber.

2. An apparatus as set forth in claim 1, further comprising a third air inlet port for providing substantially unrestricted communication between said air chamber and the open air independently of said first and second restricted-flow air inlet ports, fourth valve means having a first position closing said third air inlet port and a second position establishing the communication between said air chamber and the open air through said third air inlet port, and fourth valve actuating means responsive to the movements of said diaphragm toward and away from the position providing said minimum volume condition of said variable-volume chamber, said fourth valve actuating means being operative to move said fourth valve means into said first position thereof in response to the movement of said diaphragm over more than a predetermined distance away from the position providing the minimum volume condition of said variable-volume chamber and into said second position thereof in response to the movement of said diaphragm over said predetermined distance toward and into the position providing said minimum volume condition in said variable-volume chamber.

3. An apparatus as set forth in claim 2, in which said fourth valve actuating means comprises a solenoid operated valve actuating unit having first and second conditions holding said fourth vavle means in said first and second position, respectively, thereof, switch means electrically connected to said solenoid operated valve actuating unit, a switch actuating element projecting into said variable-volume chamber and engageable at one end with said diaphragm and at the other end with said switch means, said switch means, said switch actuating element being movable back and fourth over said predtermined distance in a direction substantially identical with the direction of movement of said diaphragm, the movement of said switch actuating element being between a first position disengaged from said switch means and a second position in actuating engagement with said switch means, said diaphragm being in engagement with said switch actuating element for holding said switch means actuated when the diaphragm is being moved over said predetermined distance toward and away from the position providing said minimum volume condition for said variable-volume chamber, said valve actuating unit being held in the second condition thereof when said switch means is kept actuated, and biasing means for urging said switch actuating element into the second position thereof.

4. An apparatus as set forth in claim 3, in which said predetermined distance is such that will hold said diaphragm in a position operative to hold said clutch in a condition immediately prior to engagement in said partial torque transmission range when said diaphragm is moved away from the position providing said minimum volume condition toward the position providing said maximum colume condition of said variable-volume chamber.

5. An apparatus as set forth in claim 1, further comprising means responsive to movement of the accelerator pedal for causing said second valve actuating means to move said second valve means into said first position thereof when the accelerator pedal is depressed to a depth greater than a predetermined value from the released position thereof.

* * * * *